United States Patent
Michaelis

(10) Patent No.: US 7,099,440 B2
(45) Date of Patent: Aug. 29, 2006

(54) APPARATUS AND METHOD FOR PROVIDING SERVICE FOR TTY AND VOICE TRANSMISSION

(75) Inventor: Paul Roller Michaelis, Louisville, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 223 days.

(21) Appl. No.: 10/671,925

(22) Filed: Sep. 24, 2003

(65) Prior Publication Data

US 2005/0063520 A1    Mar. 24, 2005

(51) Int. Cl.
*H04M 11/00*    (2006.01)
(52) U.S. Cl. ........................................... 379/52
(58) Field of Classification Search ............... 379/52, 379/93.15, 93.17, 90.01
See application file for complete search history.

(56) References Cited

U.S. PATENT DOCUMENTS

| | | | |
|---|---|---|---|
| 5,604,786 A * | 2/1997 | Engelke et al. | 379/52 |
| 5,724,405 A * | 3/1998 | Engelke et al. | 379/52 |
| 6,021,178 A * | 2/2000 | Locke et al. | 379/52 |
| 6,381,472 B1 * | 4/2002 | LaMedica et al. | 379/52 |
| 6,421,425 B1 * | 7/2002 | Bossi et al. | 379/52 |
| 2002/0085703 A1 * | 7/2002 | Proctor | 379/52 |
| 2002/0097866 A1 * | 7/2002 | Michaelis | 379/52 |
| 2005/0064899 A1 * | 3/2005 | Angelopoulos et al. | 379/52 |

* cited by examiner

*Primary Examiner*—Stella Woo
(74) *Attorney, Agent, or Firm*—John C. Moran

(57) ABSTRACT

An apparatus and method communicate TTY calls by detecting a TTY call, determining that a digital display on a first telecommunication terminal is to be used to display TTY information of the call from a second telecommunication terminal and that audio information will be transmitted to the second telecommunication terminal, converting the TTY information from the second telecommunication terminal to digital display information, transmitting the digital display information to the first telecommunication terminal, and muting an incoming call audio path from the second telecommunication terminal to the first telecommunication terminal.

43 Claims, 10 Drawing Sheets

APPARATUS AND METHOD FOR PROVIDING SERVICE FOR TTY AND VOICE TRANSMISSION

TECHNICAL FIELD

This invention relates to telecommunication systems and methods in general, and in particular, to the control of telecommunication calls involving TTY transmissions.

BACKGROUND OF THE INVENTION

TTYs (also known as TDDs) are text terminals that people with hearing impairments use in order to communicate over telephone lines. In the United States, the most commonly used TTY communication protocol is the technique specified by ANSI/TIA/EIA 825 ("A 45.45 Baud FSK Modem"). Relevant characteristics of this protocol include the following:

(1) TTYs are silent when not transmitting. Unlike fax machines and computer modems, TTYs have no "handshake" procedure at the start of a call, nor do they have a carrier tone during the call. Although this approach tends to limit the speed of transmission, it has the advantage of permitting TTY tones, DTMF (Dual Tone Multi-Frequency signals, also known as "touch tones"), and voice to be intermixed on the same call.

(2) Operation is "half duplex." TTY users must take turns transmitting, and typically cannot interrupt each other. If both people try to type at the same time, their TTYs will show no text at all, or will show text that is gibberish. There is no automatic mechanism that lets TTY users know when a character they have typed correctly has been received incorrectly. To avoid this problem, a user normally types a message and then types "GA" (for go ahead). This does solve the problem of half duplex operation but results in a slow, jerky operation which tends to limit spontaneous interaction.

(3) Each TTY character consists of a sequence of seven individual tones. The first tone is always a "start tone" at 1800 Hz. This is followed by a series of five tones, at either 1400 or 1800 Hz, which specify the character. The final tone in the sequence is always a "stop tone" at 1400 Hz. The "stop tone" is a border that separates this character from the next. Each of the first six tones is 22 milliseconds in duration. The final "stop tone" may also be 22 milliseconds, but is permitted to be as long as 44 milliseconds. This means that the duration of each TTY character is at least 154 milliseconds, which works out to approximately six and a half characters per second. (The description of this as a "45.45 Baud" protocol is based on the number of 22-millisecond tones that can be transmitted in one second, not the number of characters.)

From a usability perspective, one of the benefits to using a half-duplex, carrier-free protocol for TTYs is that it is possible to intermix voice and TTY transmissions on the same call. This is important because nearly half the people who use TTYs are individuals with moderate hearing loss who nevertheless are able to speak clearly; these individuals often prefer to receive with their TTYs and then speak in response, a process commonly referred to as Voice Carry Over or VCO. Another common pattern is for individuals (including those who hear adequately but do not speak clearly) to alternate between TTY and voice on the same call, relying on voice for informal conversation and TTY for critical information such as addresses and credit card numbers.

From a usability perspective, this protocol also has several disadvantages, including: (1) TTY users must take turns typing to each other, and are unable to interrupt each other. (2) VCO users (individuals who prefer to receive via TTY and then speak in response) need a TTY device or specialized VCO telephone in order to communicate. (3) People who receive a TTY message in their voicemail mailbox (which may include mailbox owners who have no communication disabilities, and therefore no easy access to a TTY), need a TTY device or specialized software to read the message. (4) The absence of handshake tones means that there is no mechanism by which to detect that a person is a TTY user until that person starts typing. (5) The protocol itself, although very robust when used in conjunction with traditional circuit-switched analog or digital telephony systems, tends to be unreliable when used in telephony systems that employ packet switching (e.g., Voice over Internet Protocol networks) or voice-optimized audio compression techniques (e.g., the GSM encoding used in many wireless systems).

FIGS. 1 and 2 illustrate the problems of performing VCO operations with a standard, 45.45 Baud, TTY such as TTY 102. To transmit or receive TTY information to other party 109, user 108 has to place the handset 107 into TTY 102 as illustrated in FIG. 1. FIG. 3 illustrates a pictorial view of a telephone such as shown in FIG. 1 having telephone 301 and TTY 302. If user 108 wants to use VCO operations, user 108 has to receive TTY information as illustrated in FIG. 1, but speaks by first removing handset 107 from the acoustic coupler of TTY 102 as illustrated in FIG. 2 and then speaking. To once again receive TTY information, user 108 has to place handset 107 back into the acoustic coupler of TTY 102 before other party 109 transmits TTY information to TTY 102. This type of VCO operation is awkward at best.

The 45.45 Baud FSK protocol has been used in United States TTYs since 1963, and is based largely on the protocol that was used in military teletypewriters during the Second World War. Quite obviously, modern techniques would permit the development of new protocols that retain the advantages of the current protocol, while eliminating the disadvantages. Although many new protocols with excellent capabilities have been proposed, an important barrier stands in the way of their general acceptance: by some estimates, as many as 40,000,000 TTYs that use the 45.45 Baud protocol have been manufactured and distributed since 1963. This constitutes an enormous embedded base that cannot be upgraded or replaced economically. For this reason, it is desirable to solve the usability problems in a manner that does not require the 45.45 Baud protocol, and millions of current-generation TTY devices, to be abandoned.

Among the above-listed problems associated with the 45.45 Baud protocol, the issue that has been addressed explicitly in prior art concerns the inability of packet switched networks or voice-optimized compression codecs to support reliable TTY communication. Attention has been paid to these problems largely because, in the United States, Section 508 of the Workforce Investment Act of 1998, as well as Sections 251(a)(2) and 255 of the Telecommunication Act of 1996, require telephony systems to be TTY compatible.

In the prior art, it has been recognized that TTY signals need not be transmitted as audio tones, and may instead be converted and transmitted as digital information in a more reliable non-audio data channel. U.S. Pat. No. 6,351,495 discloses a cellular transmission system where TTY audio signals are recognized and converted to digital information for transmission via the signal transmission portion of the cellular system. Also, in the prior art for VoIP systems, it is known to encode precision tones such as multi-frequency dial tones as digital information and transport this digital information to a destination point via a signaling channel that is distinct from the bearer channel used for encoded voice. One such VoIP system that transports multi-frequency dial tones in this manner is disclosed in U.S. patent application Ser. No. 09/18,909, entitled "Integration of Remote Access and Service", filed Nov. 22, 2000, and assigned to the same assignee as the present patent application. U.S. patent application Ser. No. 09/18,909 is hereby incorporated by reference. It is important to note, however, that objective of these approaches is to permit the original audio tones to be reconstructed accurately at the receiving location. Although the problem of reliable transport for TTY signals on wireless or VoIP networks is addressed by these approaches, a problem that remains is that a user who receives these transmissions still requires a TTY device or specialized software to translate the transmissions into human-readable text.

SUMMARY OF THE INVENTION

An apparatus and method communicate TTY calls by detecting a TTY call, determining that a digital display on a first telecommunication terminal is to be used to display TTY information of the call from a second telecommunication terminal and that audio information will be transmitted to the second telecommunication terminal, converting the TTY information from the second telecommunication terminal to digital display information, transmitting the digital display information to the first telecommunication terminal, and muting an incoming call audio path from the second telecommunication terminal to the first telecommunication terminal.

DETAILED DESCRIPTION

Figure 1:
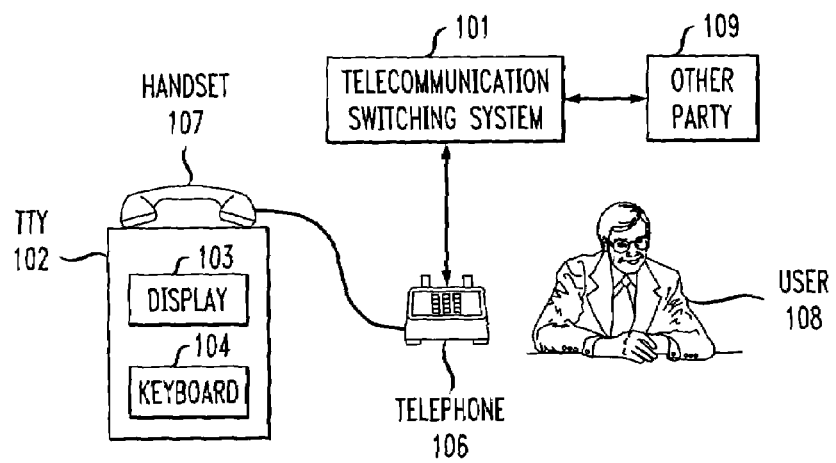
FIGS. 1 and 2 illustrate a prior art arrangement for performing VCO operations.
Figure 2:
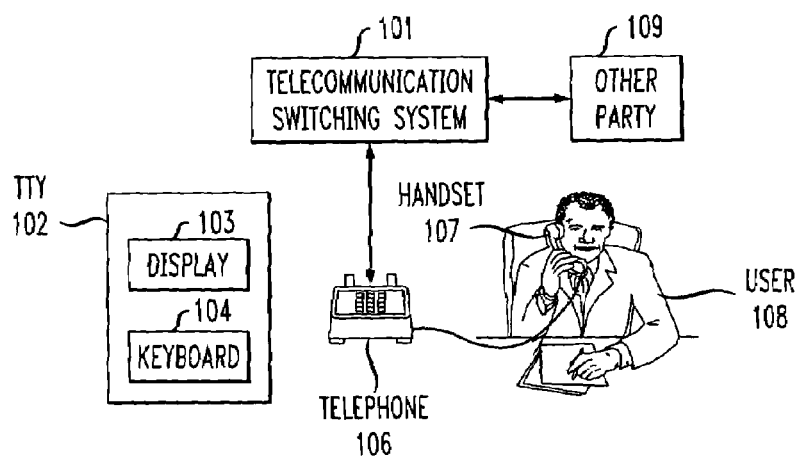
Figure 3:
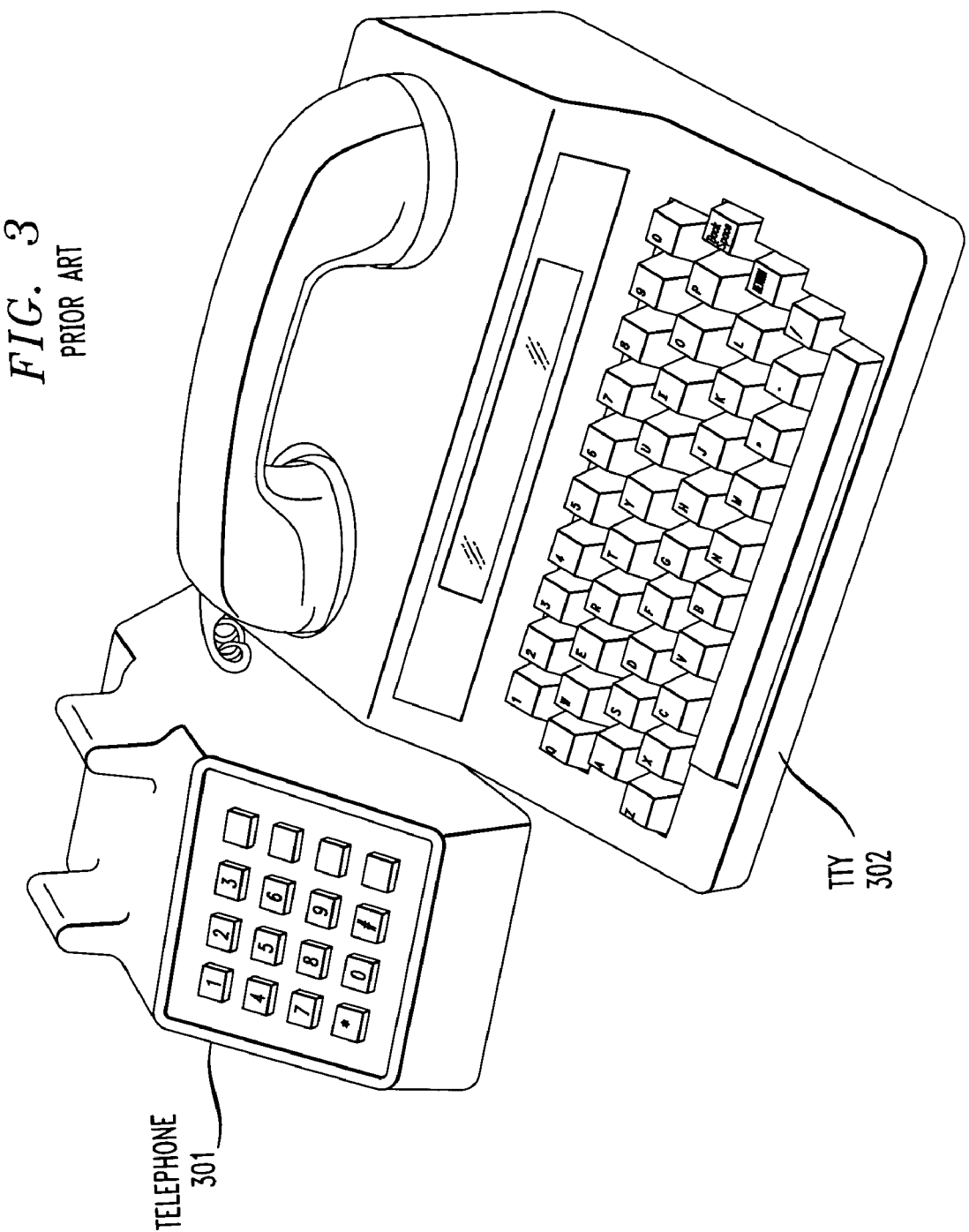
FIG. 3 pictorial view of the telephone and TTY terminal of FIG. 1.
Figure 4A:
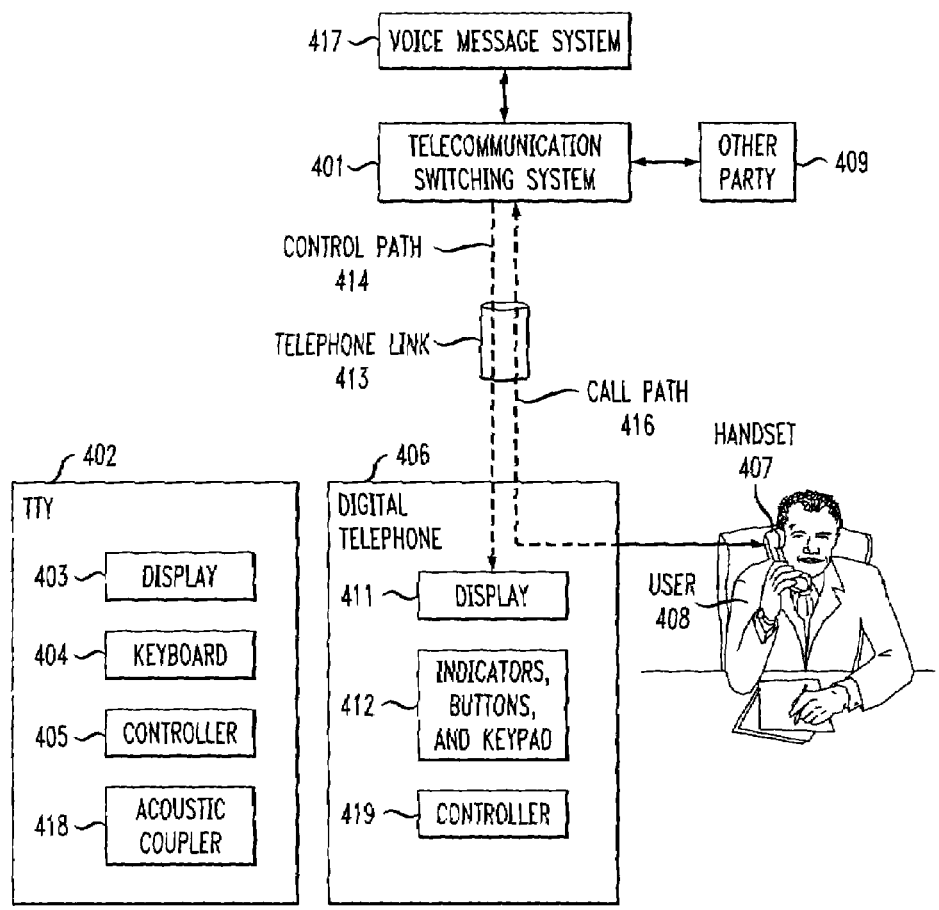
FIGS. 4A, 4B and 4C illustrate, in block diagram form, embodiments of systems for implementing the invention.
Figure 7:
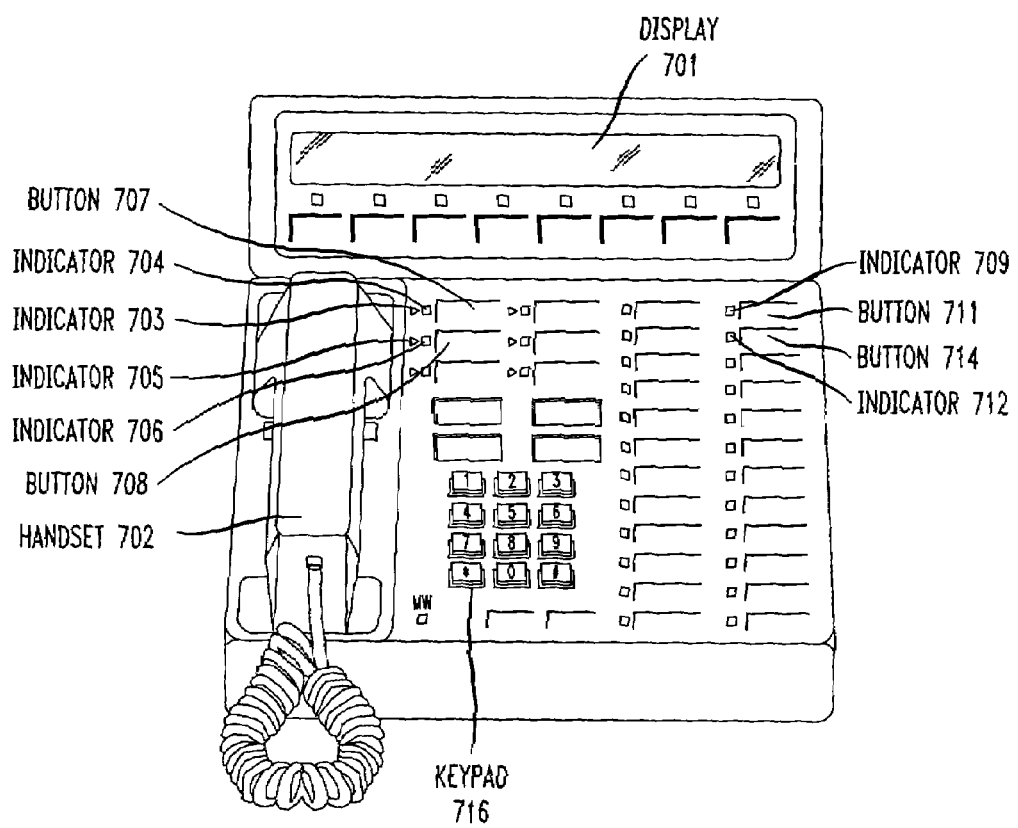
FIG. 7 illustrates, in pictorial form, an embodiment of a digital telephone.

FIG. 4A illustrates an embodiment of a system for implementing the invention. Controller 405 provides overall control of TTY 402, and controller 419 provides overall control of digital telephone 406. For VCO operation, user 408 will signal telecommunication switching system 401 that user 408 wants to receive TTY information on alphanumeric display 411 and transmit information by speaking into handset 407 of digital telephone 406 as illustrated in FIG. 4A. An example of a digital telephone such as digital telephone 406 is illustrated in FIG. 7. Digital telephone 406 can be an ISDN, IP, or proprietary digital protocol telephone. During this VCO operation, TTY 402 is not used at all, and only digital telephone 406 is required; hence, if user 408 can function well performing only VCO operations, user 408 does not have to have TTY 402. To perform VCO operations, telecommunication switching system 401 transmits TTY information via control path 414 of telephone link 413 to alphanumeric display 411 and receives voice information from handset 407 via call path 416 of telephone link 413. In one embodiment, user 408 may use a button of indicators, buttons and keypad 412 to signal telecommunication switching system 401 to start VCO operations. In another embodiment, telecommunication switching system 401 automatically detects TTY information and starts VCO operations.

To retrieve TTY messages stored on voice message system 417, user 408 only needs to use digital telephone 406.

Full duplex operation is also implemented by the embodiment illustrated in FIG. 4A. For full duplex operation, user 408 will signal telecommunication switching system 401 that user 408 wants to receive TTY information on alphanumeric display 411 and transmit audio information by via handset 407 of digital telephone 406 as illustrated in FIG. 4A. Handset 407 is inserted into acoustic coupler 418. Assuming that other party 409 also has a TTY and digital telephone similar to TTY 402 and digital telephone 406, respectively, other party 409 will similarly signal telecommunication switching system 401. TTY information typed by user 408 will be displayed on display 403 of TTY 402 and transmitted via call path 416 to telecommunication switching system 401. TTY information received from other party 409 via control path 414 will be displayed on display 411 of digital telephone 406. Other party 409 will function in a similar manner. This full duplex operation allows the simultaneous and spontaneous exchange of TTY information between the two users.

Figure 4B:
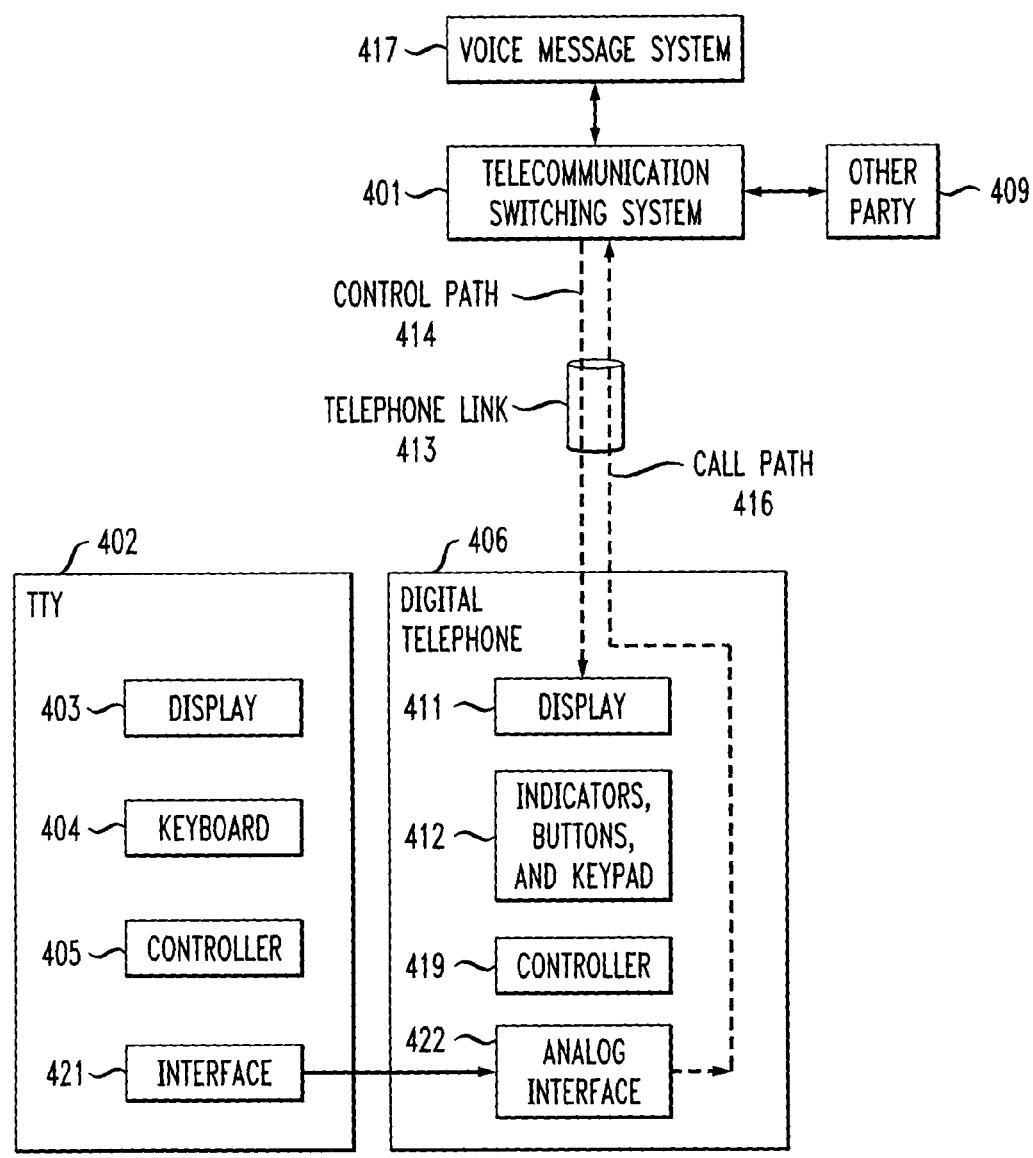

Full duplex operation is also implemented by the embodiment illustrated in FIG. 4B. Call path 416 communicates the audio information from TTY 402 to telecommunication switching system 401. Analog interface 422 provides this audio information that is received from TTY 402. TTY 402 uses interface 421 to communicate with analog interface 422. Interfaces 421 and 422 are well known to those skilled in the art. TTY information typed by user 408 will be displayed on display 403 of TTY 402 and transmitted on call path 416 to telecommunication switching system 401. TTY information received from other party 409 via control path 414 will be displayed on display 411 of digital telephone 406. Other party 409 will function in a similar manner.

Figure 4C:
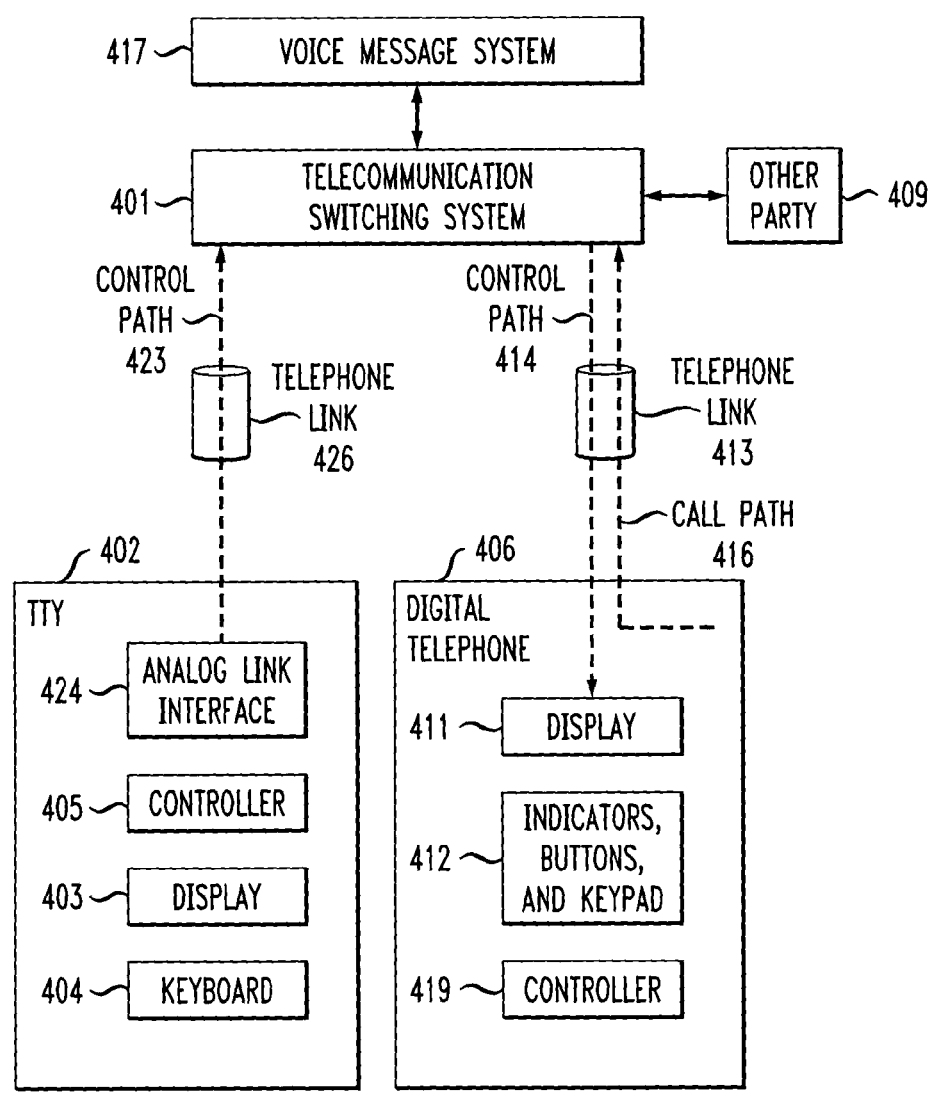

Full duplex operation is also implemented by the embodiment illustrated in FIG. 4C. TTY 402 is connected to telecommunication switching system 401 via analog link interface 424 and telephone link 426. Telecommunication switching system 401 provisions links 413 and 424 as a bridged line appearance resulting in links 413 and 424 being permanently conferenced together and given identical audio path processing. (Bridged line appearances are well know to those skilled in the art.) TTY information typed by user 408 will be displayed on display 403 of TTY 402 and transmitted on call path 423 to telecommunication switching system 401. Call path 416 is not used. TTY information received from other party 409 via control path 414 will be displayed on display 411 of digital telephone 406. Other party 409 will function in a similar manner.

Figure 5:
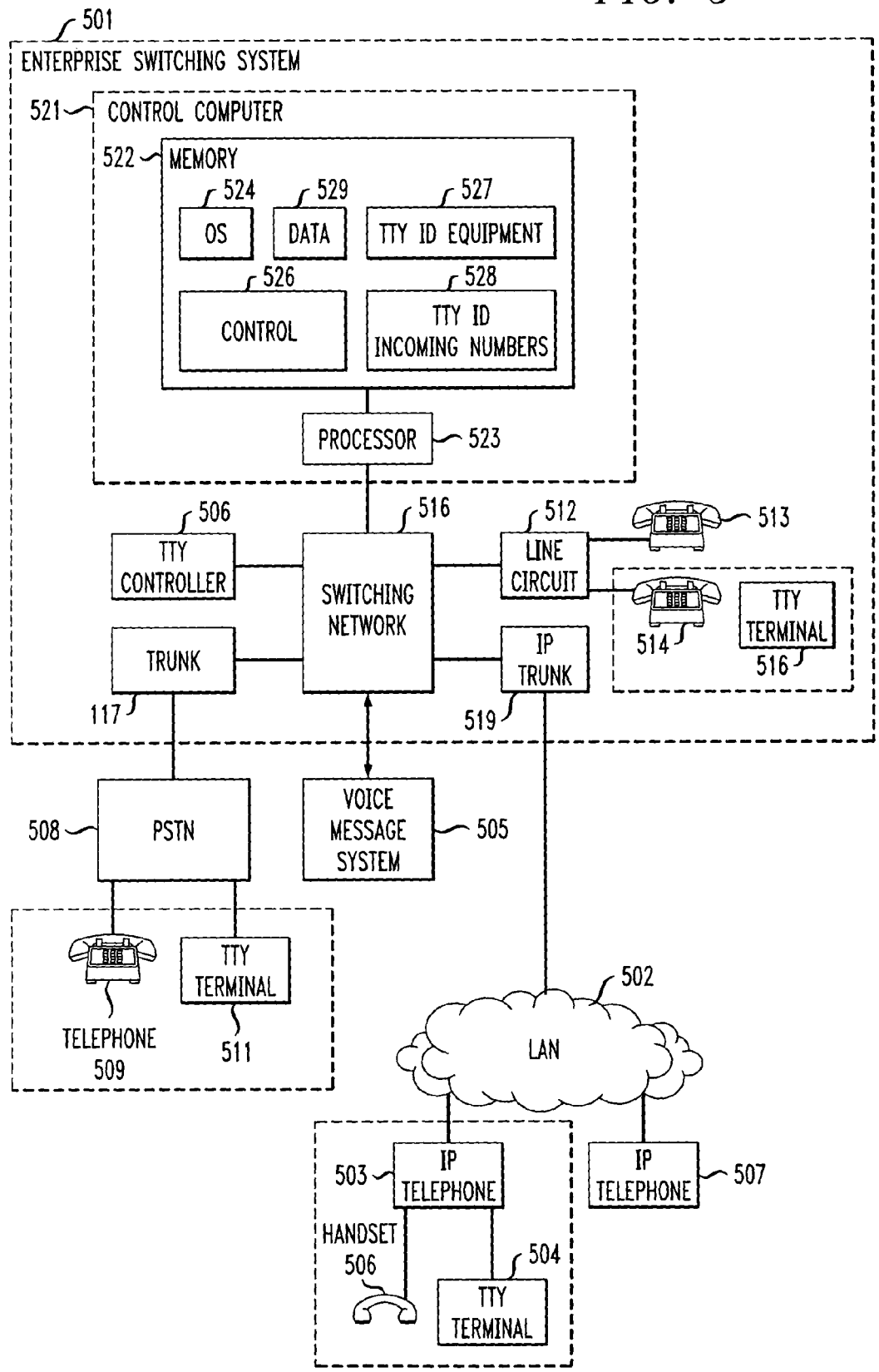
FIG. 5 illustrates, in block diagram form, an embodiment of a system for implementing the invention.

FIG. 5 illustrates an embodiment of a system for implementing the invention. Enterprise switching system 501 is providing service for directly connected telephones 513–114 via line circuit 512 and switching network 516. Telephones 513–514 are digital telephone using either an ISDN telephone or proprietary protocol digital telephones. Digital telephones have alphanumeric displays that are controlled by control computer 521 via a signaling/control channel. Digital telephone 514 supports TTY terminal 515. Further, enterprise switching system 501 is providing call operations for IP telephone 503 and IP telephone 507 via LAN 502, IP trunk 519, and switching network 516. One skilled in the art would readily realize that there would be more wired telephones and IP telephones in a system such as illustrated in FIG. 5. IP telephone 503 is illustrated as being able to communicate with a user via handset 506 and TTY terminal 504. IP telephone 503 also provides visual and other audio alerting means. A WAN or other digital networks well known to those skilled in the art may be used in place of LAN 502. Control computer 521 controls Enterprise switching system 501. The operations of processor 523 and memory 522 will be detailed later. TTY controller 506 illustrates an embodiment of a controller for implementing the invention.

Enterprise switching system 501 is interconnected to public telephone switching network 508 via trunk 517. For illustration purposes, public telephone switching network 508 is illustrated as being connected to only telephone 509 and TTY terminal 511. However, one skilled in the art would readily realize that there would be a multitude of telephone equipment connected to public telephone switching network 508.

Figure 6:
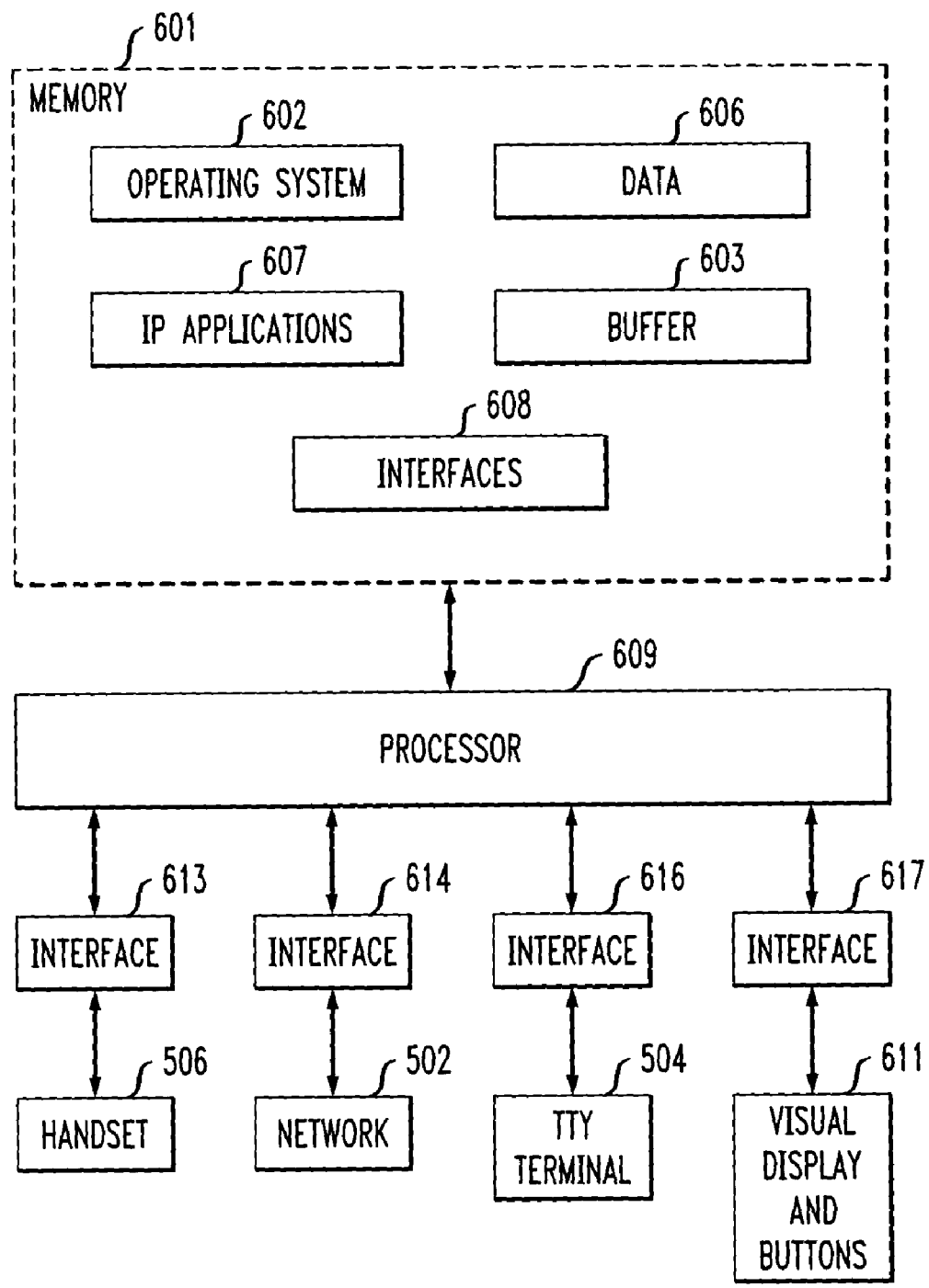
FIG. 6 illustrates, in block diagram form, an embodiment of an IP telephone.

FIG. 6 illustrates, in block diagram form, an embodiment of an IP telephone such as IP telephone 503. Processor 609 controls the operations of the IP telephone by executing applications stored in memory 601 utilizing data also stored there. Processor 609 communicates information with handset 506 via interface 613 and communicates with LAN 502 via interface 614. Communication with a TTY terminal is via interface 616. The IP telephone also has a visual display, buttons, and alerting means to provide signaling to and from the user. These visual displays, buttons, etc. are illustrated as block 611. Processor 609 communicates with block 611 via interface 617.

To perform the operations of an IP telephone, processor 609 executes IP applications 607 stored in memory 601. The overall control of the IP telephone is provided by execution of operating system 602 by processor 609. Processor 609 utilizes data 606 for the storage of various types of parameters and information. Buffer 603 is used to provide storage for audio or TTY information. To communicate with interfaces 613–617, processor 609 executes interfaces application 608.

FIG. 7 illustrates an embodiment of a telephone set such as IP telephone 503 or digital telephone 514. With respect to an IP telephone as illustrated in FIG. 6, visual display and buttons block 611 would include display 701, keypad 716, indicators such as indicators 704–706, 709, and 712, buttons such as 706–708, 711, and 714. The other buttons and indicators illustrated in FIG. 7 will also comprise block 611 of FIG. 6. Handset 702 also would be comparable to handset 506.

To illustrate the various embodiments, consider the following example. Control computer 521 receives an incoming call or an outgoing call which computer 521 determines may utilize TTY transmission. Assume that the call is being placed from telephone 509 and TTY terminal 511 to IP telephone 506. In order to detect the possibility that TTY transmissions may occur, control computer 521 utilizes the data stored in TTY ID equipment block 527 and TTY ID incoming numbers block 528 as disclosed in U.S. patent application Ser. No. 10/406,337, entitled "Apparatus and Method for Transitioning Between TTY and Voice Transmission Modes", filed Apr. 3, 2003 and assigned to the same assignee as the present patent application. U.S. patent application Ser. No. 10/406,337 is hereby incorporated by reference. If the user of IP telephone 503 has indicated to control computer 521 earlier by actuation of a button such as button 711, that the user wished to utilize display 701 to receive TTY information rather than TTY terminal 504, control computer 521 mutes the transmission path from enterprise switching system 501 to IP telephone 503. Control computer 521 transmits any TTY characters received from TTY terminal 511 as control information that will be displayed on display 701. This allows the user of IP telephone 503 to utilize either TTY terminal 504 to respond to information being displayed on display 701 or speak the response via handset 506.

In another embodiment, control computer 521 will signal the user of IP telephone 503 by utilizing a spare indicator such as indicator 712 to indicate that the incoming call may be a TTY call or by displaying a message on display 701. In response to this indication, the user can indicate that the display 701 is to be utilized by actuating a button such as button 711. One skilled in the art will realize that the indicators and the buttons illustrated in FIG. 7 are assignable to any function by control computer 521. Control computer 521 stores the fact that button 711 has been actuated in data 529 for later use.

Digital telephone 514 operates in a similar manner utilizing TTY terminal 515 as was previously described for IP telephone 503.

Control computer 521 performs similar functions if it detects that an outgoing call is being made from digital telephone 514 or IP telephone 503 since it would recognize that these terminals were capable of producing TTY transmissions based on information in TTY ID equipment block 527 or actuation of a button.

Consider another example to further illustrate the embodiments. Assume that a TTY message has been recorded in voice message system 505 for one of the telephones interconnected to enterprise switching system 501. If control computer 521 determined that the message could be a TTY transmission before its storage in voice message system 505, control computer 521 stores an indication of this fact. In another embodiment, voice message system 505 may store an indication. In response to such an indication and upon accessing the voice message from voice message system 505, control computer 521 utilizes TTY controller 506 to convert the TTY information to text information. Then, control computer 521 transmits the text information to a display such as display 701 so that the user can view this information. In another embodiment, voice message system 505 will automatically convert the TTY information to text before storing the message. If a user of a digital telephone such as digital telephone 513 is recovering a message stored in voice message system 505 which had not been previously determined to have TTY information, the user can actuate a button such as button 714 of FIG. 7 to indicate to control computer 521 that this is a TTY transmission. Control computer 521 is responsive to the button actuation to request that voice message system 505 restart the message. Control computer 521 then bridges TTY controller 506 into the transmission path, mutes the transmission path to digital telephone 513, and utilizes the display of digital telephone 513 to display the TTY message to the user as it is retrieved from voice message system 505.

Figure 8:
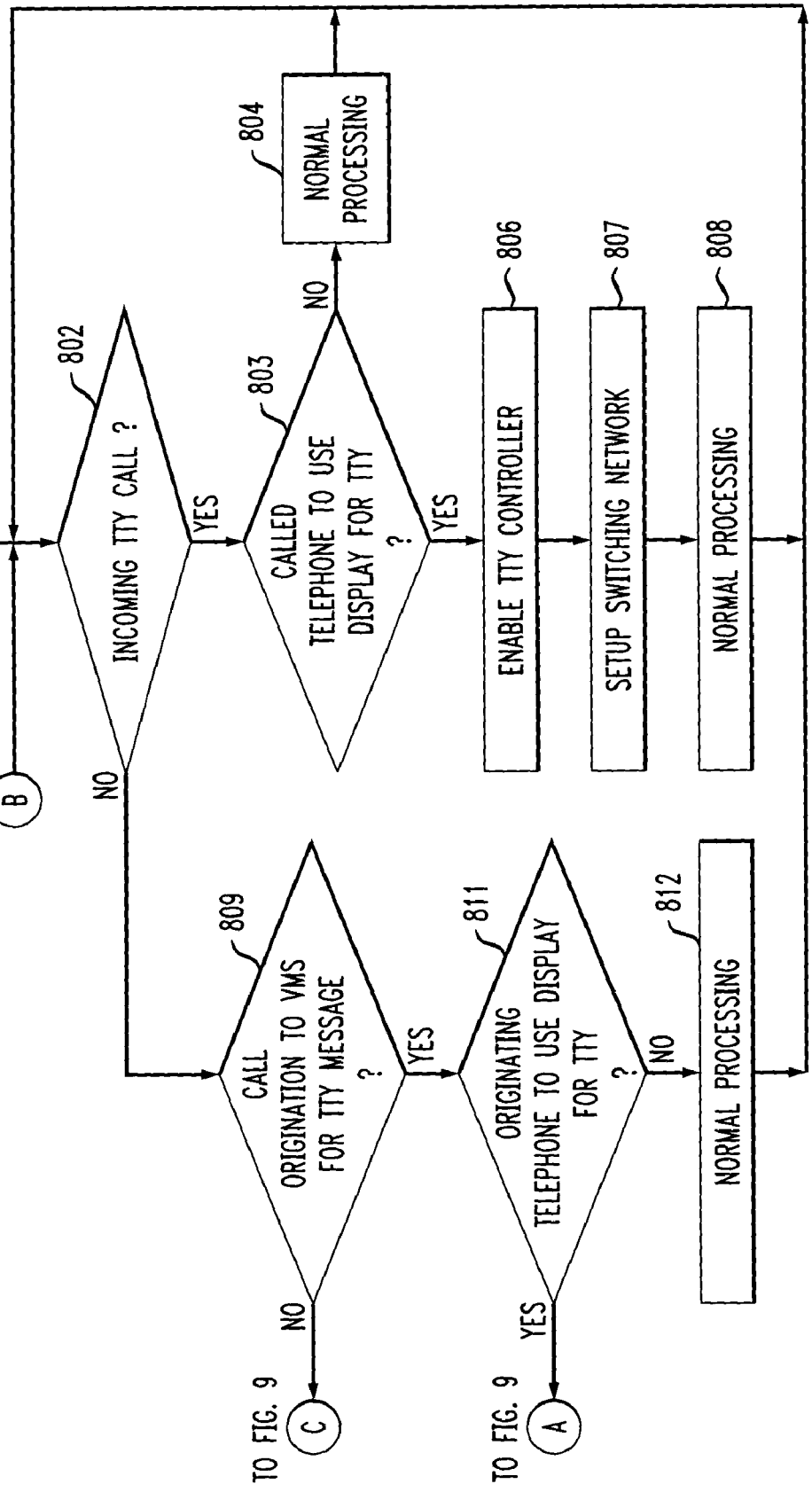
FIGS. 8 and 9 illustrate, in flowchart form, an embodiment of operations performed for implementing the invention.
Figure 9:
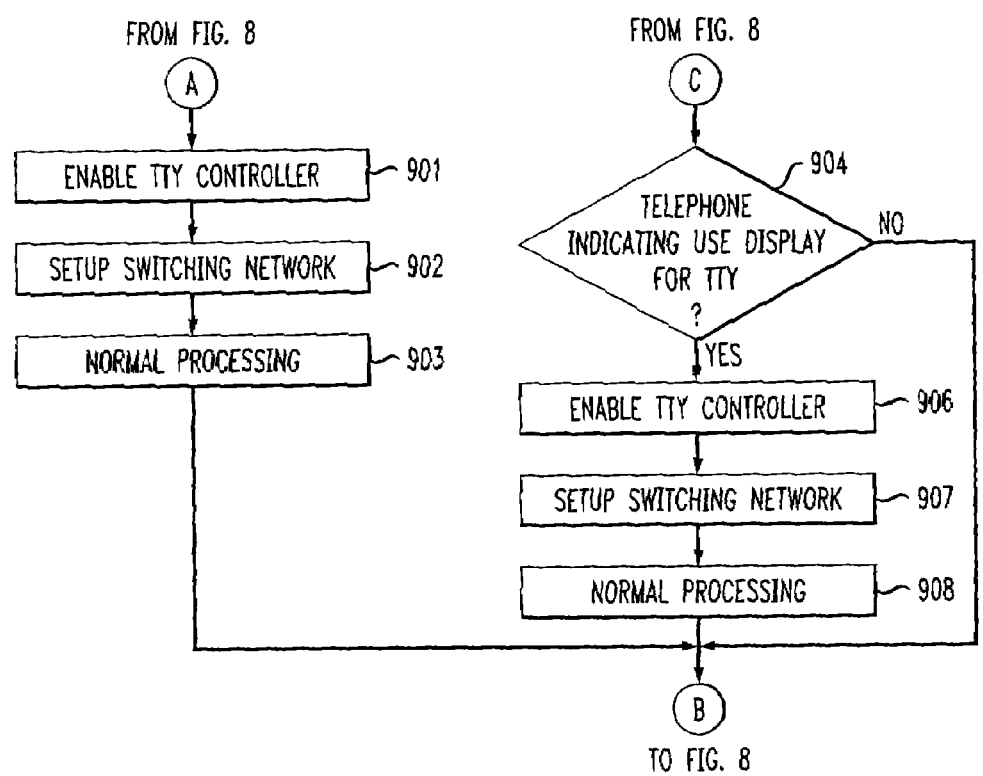

FIGS. 8 and 9 illustrate, in flowchart form, an embodiment of operations performed by a control computer controlling a telecommunication system such as control computer 521. After being started in block 801, decision block 802 determines if the incoming call is using TTY transmissions. If the answer is yes, decision block 803 determines if the called telephone is to display the TTY incoming information on its digital display. As previously noted, the computer controlling the telecommunication operation can make this decision based on service information for the called telephone or the fact that the called telephone indicates by actuation of a button when the call is set up to the called telephone. Decision block 803 also performs the operation of the called telephone being informed that the incoming is or may be a TTY call. If the answer is no in decision block 803, control is transferred to block 804 which processes the incoming call in a normal manner before returning control back to decision block 802.

If the answer in decision block 803 is yes, the TTY controller is enabled to translate the TTY encoded characters into the digital display format, and the switching network is set up by block 807 to transport both the audio and the digital display information to the called telephone. Finally, block 808 performs normal processing before returning control back to decision block 802.

Returning to decision block 802, if there is not an incoming TTY call, control is transferred to decision block 809 which determines if a telephone is originating a call to a voice messaging system for a TTY message. Either the voice message system or the control computer may make the determination of a TTY message. If the answer is yes, control is transferred to decision block 811 which determines if the originating telephone has indicated in some manner that the digital display is to be used for the TTY information. If the answer is no, block 812 performs normal processing before returning control back to decision block 802.

If the answer is yes in decision block 811, control is transfer to block 901 of FIG. 9. Block 901 enables the TTY controller to perform the translation between TTY protocol characters and the digital display protocol utilized for the digital display; and block 902 properly sets up the switching network. Finally, block 903 performs normal processing before returning control back to decision block 802 of FIG. 8.

Returning to decision block 809 of FIG. 8, if the answer is no, control is transferred to decision block 904 of FIG. 9. During a normal telephone conversation i.e. one that had not been previously determined to contain TTY messages, decision block 904 determines if the telephone has indicated that it wishes to utilize the digital display for TTY information. This capability allows the user to determine at any time that it is desirable to utilize the digital display for TTY information. If the answer is yes in decision block 904, blocks 906–908 perform the same operations as blocks 901–903. If the answer is no in decision block 904, control is returned back to decision block 802.

When the operations of devices 521 and 609 are implemented in software, as is shown in FIGS. 8 and 9, it should be noted that the software can be stored on any computer-readable medium for use by or in connection with any computer related system or method. In the context of this document, a computer-readable medium is an electronic, magnetic, optical, or other physical device or means that can contain or store a computer program for use by or in connection with a computer related system or method. Devices 521 and 609 can be embodied in any computer-readable medium for use by or in connection with an instruction execution system, apparatus, or device such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. For example, the computer-readable medium can be, but is not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured via optical scanning of the paper or other medium and then compiled, interpreted or otherwise processed in a suitable manner, if necessary, and stored in a computer memory.

In an alternative embodiment, where devices 521 and 609 are implemented in hardware, devices 521 and 609 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Of course, various changes and modifications to the illustrated embodiments described above would be apparent to those skilled in the art. Such changes and modifications can be made without departing from the spirit and scope of the invention and without diminishing its intended advantages. It is therefore intended that such changes and modifications be covered by the following claims except in so far as limited by the prior art.

What is claimed is:

1. A method for communicating TTY calls, comprising the steps of:
    detecting a TTY call;
    determining that a digital display on a first telecommunication terminal is to be used to display TTY information of the call from a second telecommunication terminal and that audio information will be transmitted to the second telecommunication terminal;
    generating the audio information transmitted to the second telecommunication terminal by a TTY device wherein the audio information is received from at least one of an acoustic coupler of the TTY device via a handset of the first telecommunication terminal or an interface of the TTY device via an analog interface of the first telecommunication terminal;
    converting the TTY information to digital display information;
    transmitting the digital display information to the first telecommunication terminal; and muting an incoming call audio path from the second telecommunication terminal to the first telecommunication terminal.

2. The method of claim 1 further comprises the step of operating the TTY device and the first telecommunication terminal in a full duplex mode with respect to the second telecommunication terminal.

3. The method of claim 1 wherein the step of transmitting comprises the step of using a control path to the first telecommunication terminal.

4. The method of claim 1 further comprises the step of enabling an outgoing audio call path from the first telecommunication terminal to the second telecommunication terminal on which voice information is communicated from a handset of the first telecommunication terminal.

5. A method for communicating TTY calls, comprising the steps of:
   detecting a TTY call;
   determining that a digital display on a first telecommunication terminal is to be used to display TTY information of the call from a second telecommunication terminal and that audio information will be transmitted to the second telecommunication terminal;
   generating the audio information transmitted to the second telecommunication terminal by a TTY device;
   connecting the first telecommunication terminal to a telecommunication switching system via a first telecommunication link and the TTY device to the telecommunication switching system via a second telecommunication link; and
   transmitting the audio information to the second telecommunication terminal via the second telecommunication link;
   converting the TTY information to digital display information;
   transmitting the digital display information to the first telecommunication terminal; and
   muting an incoming call audio path from the second telecommunication terminal to the first telecommunication terminal.

6. The method of claim 5 further comprises the step of operating the TTY device and the first telecommunication terminal in a full duplex mode with respect to the second telecommunication terminal.

7. The method of claim 6 further comprises the step of establishing a bridged line appearance between the first and second telecommunication links.

8. The method of claim 5 further comprises the step of operating the TTY device and the first telecommunication terminal in a full duplex mode with respect to the second telecommunication terminal.

9. The method of claim 5 wherein the step of determining comprises the step of responding to an act of a user on the first telecommunication terminal.

10. The method of claim 9 wherein the act occurs during the TTY call.

11. The method of claim 9 wherein the act occurs before the TTY call.

12. The method of claim 5 wherein the step of detecting comprises the step of determining from stored information that the second telecommunication terminal may be transmitting TTY information.

13. The method of claim 5 wherein the second telecommunication terminal is a voice messaging system.

14. The method of claim 13 wherein the step of determining comprises the step of detecting from information stored on the voice message system that the second telecommunication terminal may be transmitting TTY information.

15. The method of claim 13 wherein the step of converting is performed by the voice message system.

16. An apparatus for communicating TTY calls, comprising:
   a computer;
   a controller;
   a switching network;
   a memory;
   the computer by execution of a control routine detecting a TTY call;
   the computer by execution of the control routine determining that a first telecommunication terminal is to display TTY information received from a second telecommunication terminal on the digital display of the first telecommunication terminal;
   the controller converting the TTY information to digital display information; and
   the switching network communicating the digital display information to the first telecommunication terminal, enabling a first audio call path to the second telecommunication terminal, and disabling a second audio call path from the second telecommunication terminal to the first telecommunication terminal.

17. The apparatus of claim 16 further comprises a TTY device generating audio information for communication on the first audio call path to the second telecommunication terminal.

18. The apparatus of claim 17 wherein the TTY device and the first telecommunication terminal operate in a full duplex mode with respect to the second telecommunication terminal.

19. The apparatus of claim 18 further comprises at least one of an acoustic coupler of the TTY device coupled to the first telecommunication terminal via a handset of the first telecommunication terminal or an interface of the TTY device coupled to the first telecommunication terminal via an analog interface of the first telecommunication terminal to generate the audio information.

20. The apparatus of claim 18 further comprises a first telecommunication link connecting the first telecommunication terminal to a telecommunication switching system and a second telecommunication link connecting the TTY device to the telecommunication switching whereby the audio information is transmitted to the second telecommunication terminal via the second telecommunication link.

21. The apparatus of claim 20 further comprises the telecommunication switching system establishing a bridged line appearance between the first and second telecommunication links.

22. The apparatus of claim 16 further comprises a handset connected to the first telecommunication terminal for generating voice information for communication on the first audio call path from the first telecommunication terminal to the second telecommunication terminal.

23. The apparatus of claim 22 wherein the handset and the first telecommunication terminal operate in a voice carry over mode.

24. The apparatus of claim 16 wherein the switching network communicating the digital display information to the first telecommunication terminal via a control path.

25. The apparatus of claim 16 wherein the computer during execution of the control routine to determine that a first telecommunication terminal is to display the TTY information accesses data in the memory.

26. The apparatus of claim 25 wherein the data stored in the memory was stored in response to an act of a user on the first telecommunication terminal.

27. The apparatus of claim 26 wherein the act occurs during the TTY call.

28. The apparatus of claim 26 wherein the act occurs before the TTY call.

29. The apparatus of claim 16 further comprises a voice message system and the voice message system is the second telecommunication terminal.

30. A processor-readable medium for communicating TTY calls, comprising processor-executable instructions configured for:
  detecting a TTY call;
  determining that a digital display on a first telecommunication terminal is to be used to display TTY information of the call from a second telecommunication terminal and that audio information will be transmitted to the second telecommunication terminal;
  generating the audio information transmitted to the second telecommunication terminal by a TTY device wherein the audio information is received from at least one of an acoustic coupler of the TTY device via a handset of the first telecommunication terminal or an interface of the TTY device via an analog interface of the first telecommunication terminal;
  converting the TTY information to digital display information;
  transmitting the digital display information to the first telecommunication terminal; and
  muting an incoming call audio path from the second telecommunication terminal to the first telecommunication terminal.

31. The processor-readable medium of claim 30 further comprises operating the TTY device and the first telecommunication terminal in a full duplex mode with respect to the second telecommunication terminal.

32. A processor-readable medium for communicating TTY calls, comprising processor-executable instructions configured for:
  detecting a TTY call;
  determining that a digital display on a first telecommunication terminal is to be used to display TTY information of the call from a second telecommunication terminal and that audio information will be transmitted to the second telecommunication terminal;
  generating the audio information transmitted to the second telecommunication terminal by a TTY device;
  connecting the first telecommunication terminal to a telecommunication switching system via a first telecommunication link and the TTY device to the telecommunication switching system via a second telecommunication link; and
  transmitting the audio information to the second telecommunication terminal via the second telecommunication link;
  converting the TTY information to digital display information;
  transmitting the digital display information to the first telecommunication terminal; and
  muting an incoming call audio path from the second telecommunication terminal to the first telecommunication terminal.

33. The processor-readable medium of claim 32 further comprises operating the TTY device and the first telecommunication terminal in a full duplex mode with respect to the second telecommunication terminal.

34. The processor-readable medium of claim 33 further comprises establishing a bridged line appearance between the first and second telecommunication links.

35. The processor-readable medium of claim 32 wherein the determining comprises responding to an act of a user on the first telecommunication terminal.

36. The processor-readable medium of claim 35 wherein the act occurs during the TTY call.

37. The processor-readable medium of claim 35 wherein the act occurs before the TTY call.

38. The processor-readable medium of claim 32 wherein the detecting comprises determining from stored information that the second telecommunication terminal may be transmitting TTY information.

39. The processor-readable medium of claim 30 wherein the transmitting comprises using a control path to the first telecommunication terminal.

40. The processor-readable medium of claim 30 further comprises the enabling an outgoing audio call path from the first telecommunication terminal to the second telecommunication terminal on which voice information is communicated from a handset of the first telecommunication terminal.

41. The processor-readable medium of claim 32 wherein the second telecommunication terminal is a voice messaging system.

42. The processor-readable medium of claim 41 wherein the determining comprises detecting from information stored on the voice message system that the second telecommunication terminal may be transmitting TTY information.

43. The processor-readable medium of claim 41 wherein the converting is performed by the voice message system.

* * * * *